(12) United States Patent
Ohmura et al.

(10) Patent No.: US 11,396,293 B2
(45) Date of Patent: Jul. 26, 2022

(54) DRIVING SUPPORT CONTROL DEVICE

(71) Applicant: MAZDA MOTOR CORPORATION, Hiroshima (JP)

(72) Inventors: Hiroshi Ohmura, Hiroshima (JP); Sahori Iimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 278 days.

(21) Appl. No.: 16/494,702

(22) PCT Filed: Feb. 16, 2018

(86) PCT No.: PCT/JP2018/005543
§ 371 (c)(1),
(2) Date: Sep. 16, 2019

(87) PCT Pub. No.: WO2018/168329
PCT Pub. Date: Sep. 20, 2018

(65) Prior Publication Data
US 2020/0010085 A1 Jan. 9, 2020

(30) Foreign Application Priority Data

Mar. 17, 2017 (JP) .............................. JP2017-052139

(51) Int. Cl.
*B60W 30/165* (2020.01)
*B60W 30/12* (2020.01)
(Continued)

(52) U.S. Cl.
CPC .......... *B60W 30/165* (2013.01); *B60W 30/12* (2013.01); *B60W 30/162* (2013.01);
(Continued)

(58) Field of Classification Search
CPC .. B60W 30/165; B60W 30/12; B60W 30/162; B60W 2554/80; B60W 2555/60;
(Continued)

(56) References Cited

U.S. PATENT DOCUMENTS

2012/0283912 A1* 11/2012 Lee ...................... B62D 15/025
701/41
2013/0006473 A1 1/2013 Buerkle et al.
(Continued)

FOREIGN PATENT DOCUMENTS

DE 10 2009 047 476 A1 6/2011
DE 102015201555 A1 8/2016
(Continued)

OTHER PUBLICATIONS

The extended European search report issued by the European Patent Office dated Feb. 11, 2020, which corresponds to European Patent Application No. 18767031.0-1012 and is related to U.S. Appl. No. 16/494,702.
(Continued)

Primary Examiner — Nadeem Odeh
(74) Attorney, Agent, or Firm — Studebaker & Brackett PC

(57) ABSTRACT

Disclosed is a driving support control device (ECU) 10 capable of controlling a vehicle 1 in accordance with any one selected from plural driving support modes by a driver. The driving support control device 10 is configured to temporally repeatedly calculate a target traveling course (R1 to R3) along which the vehicle 1 should travel, and to, in a given one (preceding vehicle following mode) of the driving support modes, execute control of causing the vehicle 1 to travel on and along the target traveling course, wherein the driving support control device 10 is operable, in a situation where a current position of the vehicle 1 deviates beyond a
(Continued)

given distance $d_{th}$ laterally from the target traveling course, to, even when the driver selects the given driving support mode, prohibit transition to the given driving support mode.

18 Claims, 8 Drawing Sheets

(51) Int. Cl.
  *B60W 30/16* (2020.01)
  *B60W 50/08* (2020.01)
(52) U.S. Cl.
  CPC ....... *B60W 50/082* (2013.01); *B60W 2554/80* (2020.02); *B60W 2555/60* (2020.02); *B60W 2720/106* (2013.01)
(58) Field of Classification Search
  CPC ..... B60W 2720/106; B60W 2554/801; B60W 60/0059; B60W 60/0051; B60W 60/0015; B60W 60/0011; B60W 2050/0074; B60W 50/082; B60W 2540/215; B60W 30/143; B60W 30/146; B60W 30/182; B60W 50/12; B60K 31/00
  See application file for complete search history.

(56) References Cited

U.S. PATENT DOCUMENTS

| | | | |
|---|---|---|---|
| 2013/0226431 A1* | 8/2013 | Lu | B60W 50/0098 701/96 |
| 2015/0166063 A1 | 6/2015 | Ishihara | |
| 2017/0021832 A1 | 1/2017 | Nakadori | |
| 2018/0011497 A1 | 1/2018 | Schroeder et al. | |
| 2018/0022351 A1* | 1/2018 | Habu | B60W 40/04 701/96 |
| 2018/0024564 A1 | 1/2018 | Matsuda | |
| 2018/0257648 A1* | 9/2018 | Katoh | B60W 30/143 |
| 2019/0241198 A1* | 8/2019 | Mori | B60W 50/14 |

FOREIGN PATENT DOCUMENTS

| | | |
|---|---|---|
| EP | 2803548 A1 | 11/2014 |
| EP | 2894081 A2 | 7/2015 |
| EP | 3121423 A1 | 1/2017 |
| JP | 2007-008281 A | 1/2007 |
| JP | 2010-238132 A | 10/2010 |
| JP | 2014-221601 A | 11/2014 |
| JP | 2015-116919 A | 6/2015 |
| JP | 2016-088334 A | 5/2016 |
| JP | 2016-224594 A | 12/2016 |
| WO | 2016/110728 A1 | 7/2016 |

OTHER PUBLICATIONS

Written Opinion issued in PCT/JP2018/005543; dated Mar. 27, 2018.
An Office Action; "Notification of Reasons for Refusal," Mailed by the Japanese Patent Office dated Jul. 23, 2018, which corresponds to Japanese Patent Application No. 2017-052139; with English language translation.
An Office Action; "Notification of Reasons for Refusal," Mailed by the Japanese Patent Office dated Nov. 12, 2018, which corresponds to Japanese Patent Application No. 2017-052139; with English language translation.
International Search Report issued in PCT/JP2018/005543; dated Mar. 27, 2018.
Communication pursuant to Article 94(3) EPC issued by the European Patent Office on Mar. 31, 2021, which corresponds to European Patent Application No. 18767031.0-1012 and is related to U.S. Appl. No. 16/494,702.

* cited by examiner

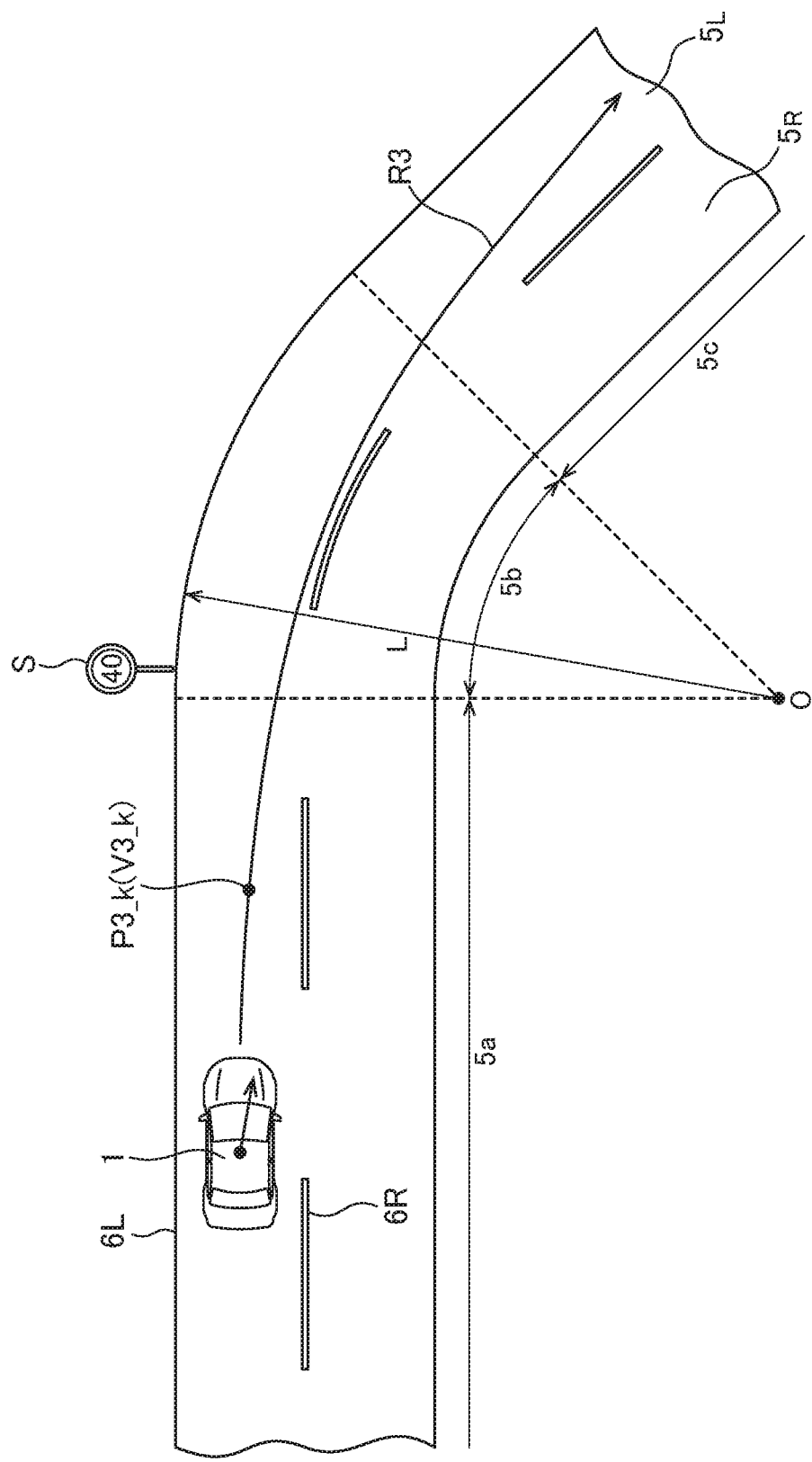

FIG.5

| Driving Support Mode | Detection of Lane | Detection of Preceding Vehicle | Target traveling course |
|---|---|---|---|
| Preceding Vehicle Following | Detectable | — | 1st traveling course (setup vehicle speed) |
| | Undetectable | Detectable | 2nd traveling course (vehicle speed of preceding vehicle) |
| | | Undetectable | 3rd traveling course |
| Automatic Speed Control | — | — | 3rd traveling course |
| Speed Limiting | — | — | 3rd traveling course |
| Basic Control | — | — | 3rd traveling course |

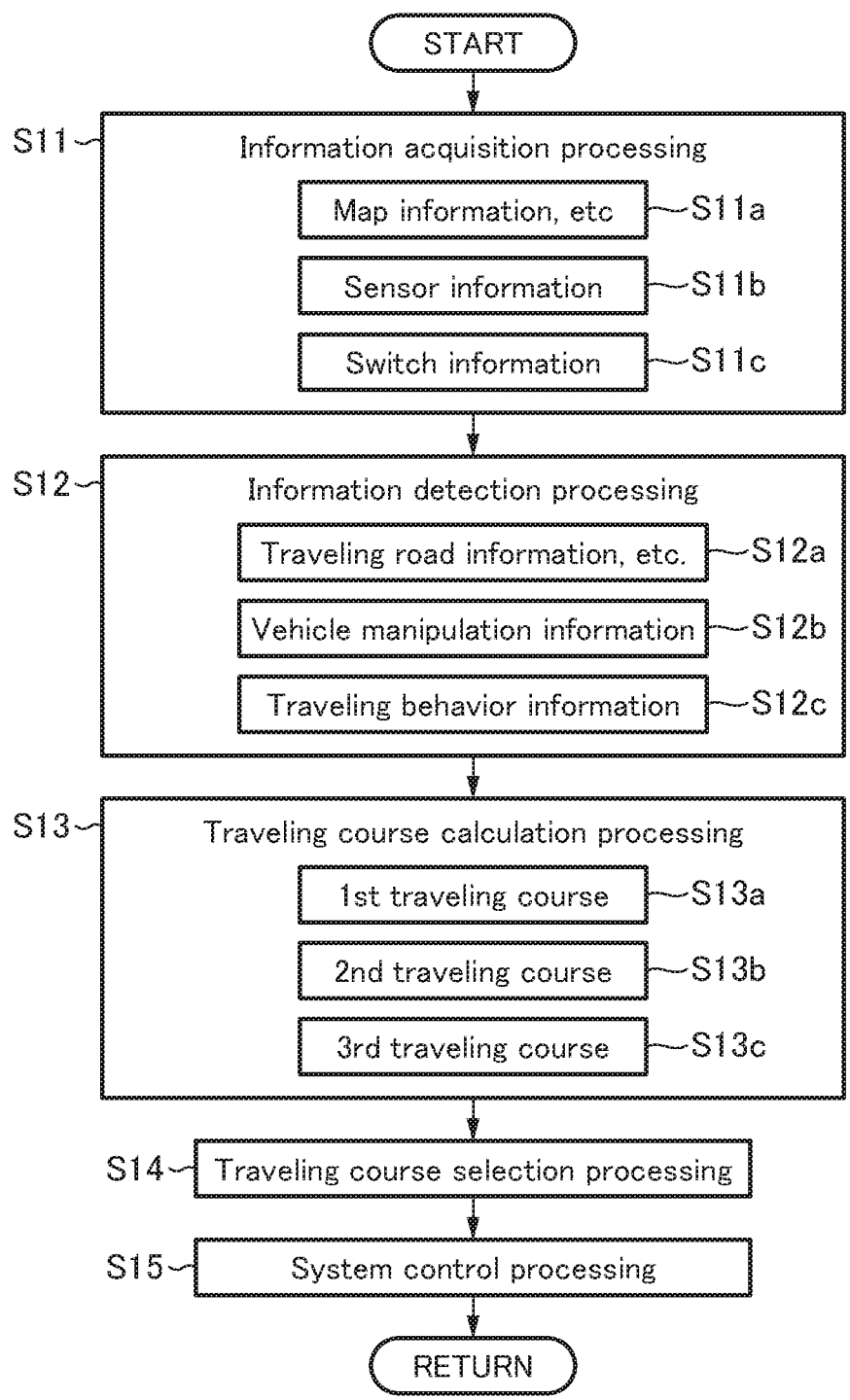

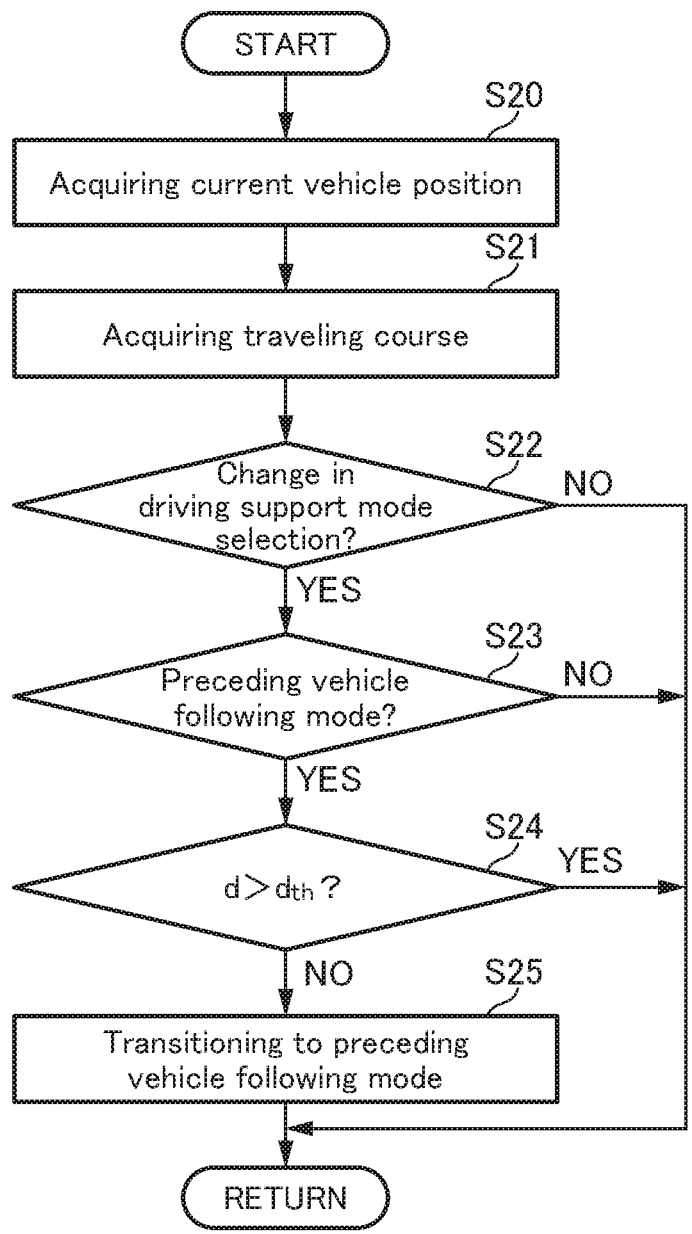

DRIVING SUPPORT CONTROL DEVICE

TECHNICAL FIELD

The present invention relates to a driving support control device, and more particularly to a driving support control device capable of providing plural driving support modes.

BACKGROUND ART

In recent years, a driving support control system has being becoming increasingly equipped in a vehicle to provide a given driving support mode to a driver (see, for example, the following Patent Document 1). A driving support control system described in the Patent Document 1 is configured to, in response to switch manipulation by a driver, cause switching from a manual driving mode (off mode) to an automatic driving mode (driving support mode). This system is configured to permit such a mode transition when a vehicle satisfies a given condition. Examples of the given condition include a condition that no modification is made in the vehicle, and a condition that a current vehicle speed does not exceed a legal speed limit.

CITATION LIST

Patent Document

Patent Document 1: JP 2016-088334A

SUMMARY OF INVENTION

Technical Problem

However, a recent driving support control system has become possible to provide plural driving support modes. Thus, there is a problem that it is necessary to set an appropriate switching condition not only for the aforementioned switching from the off mode to the driving support mode but also for switching among the plural driving support modes, in consideration of safety.

Further, as new insight, the present inventors have discovered that a driving mode switching which is safe and free of stressing a driver cannot be ensured without setting a switching condition while taking into account a traveling course to be set in each driving support mode.

The present invention has been made to solve the above problems, and an object thereof is to provide a driving support control device capable of enabling a safe mode transition during switching among plural driving support modes.

Solution to Technical Problem

In order to achieve the above object, the present invention provides a driving support control device capable of controlling a vehicle in accordance with any one selected from plural driving support modes by a driver. The driving support control device is configured to temporally repeatedly calculate a target traveling course along which the vehicle should travel, and to, in a given one of the driving support modes, execute control of causing the vehicle to travel on and along the target traveling course, wherein the driving support control device is operable, in a situation where a current position of the vehicle deviates beyond a given distance laterally from the target traveling course, to, even when the driver selects the given driving support mode, prohibit transition to the given driving support mode.

In the driving support control device of the present invention having the above feature, in a situation where, when the driver selects a desired driving support mode so as to switch among the plural driving support modes, the selected driving support mode is a mode for controlling the vehicle to travel on and along the target traveling course, and a current position of the vehicle deviates beyond a given distance laterally from the target traveling course, mode transition to the selected driving support mode is not executed. That is, in the present invention, in a situation where the driver drives the vehicle to travel along a position deviating from the target traveling course, purposefully (with a view to avoid an obstacle), transition to the given driving support mode is prohibited. This makes it possible to prevent the vehicle from starting moving toward an unintended position (e.g., a position where an obstacle exists) immediately after switching to the given driving support mode. As above, in the present invention, during the driving support mode switching, it becomes possible to perform mode transition which is safe and less likely to give the driver a feeling of strangeness.

In a specific embodiment of the present invention, the target traveling course is a traveling course set to maintain traveling within a traveling road.

In a specific embodiment of the present invention, the driving support control device is operable, in response to a given manipulation by the driver, to start mode switching processing for switching to the driving support mode selected by the driver.

In a specific embodiment of the present invention, the driving support control device is operable, when the given driving support mode is selected during execution of a driving support mode other than the given driving support mode, in the situation where the current position of the vehicle deviates beyond the given distance laterally from the target traveling course, to prohibit transition to the given driving support mode.

In a specific embodiment of the present invention, the driving support control device is operable to: temporally repeatedly calculate a first traveling course which is set to maintain traveling within the traveling road, a second traveling course which is set to follow a trajectory of a preceding vehicle, and a third traveling course which is set based on a current traveling behavior of the vehicle on a traveling road; and select, as the target traveling course, one of the calculated traveling courses, based on the driving support mode selected by the driver.

In a specific embodiment of the present invention, the plural driving support modes include: an automatic speed control mode in which control of causing the vehicle to travel at a given setup vehicle speed is executed; a preceding vehicle following mode in which control of causing the vehicle to follow a preceding vehicle is executed; and a speed limiting mode in which a vehicle speed of the vehicle is restricted from exceeding a legal speed limit designated by a speed sign on a road, wherein the given driving support mode is the preceding vehicle following mode.

Effect of Invention

The driving support control device of the present invention makes it possible to enable a safe mode transition during switching among plural driving support modes.

BRIEF DESCRIPTION OF DRAWINGS

FIG. 4 is an explanatory diagram of a third traveling course in this embodiment.

FIG. 5 is an explanatory diagram showing a relationship between a driving support mode and a target traveling course, in this embodiment.

FIG. 6 is a processing flow of driving support control in this embodiment.

FIG. 8 is a processing flow during switching to a preceding vehicle following mode in this embodiment.

DESCRIPTION OF EMBODIMENTS

Figure 1:
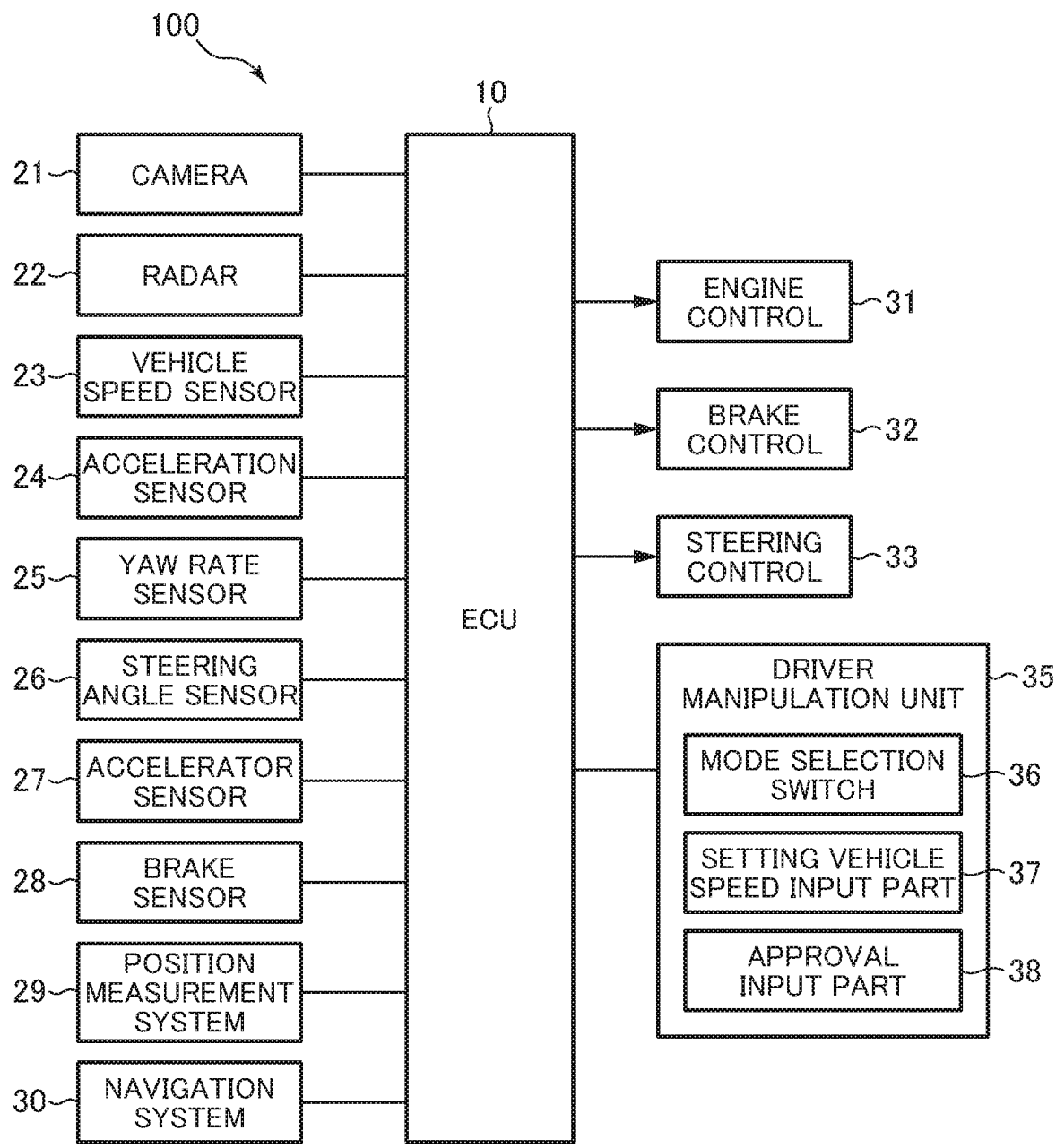
FIG. 1 is a configuration diagram of a driving support control system according to one embodiment of the present invention.

With reference to the accompanying drawings, a driving support control system according to one embodiments of the present invention will now be described. First of all, the configuration of the driving support control system will be described with reference to FIG. 1. FIG. 1 is a configuration diagram of the driving support control system.

The driving support control system 100 according to this embodiment is configured to provide different drive support controls to a vehicle 1 (see FIG. 2) in accordance with plural driving support modes, respectively. A driver can select a desired one of the plural driving support modes.

As shown in FIG. 1, the driving support control system 100 is equipped in the vehicle 1, and comprises a driving support control device (ECU) 10, plural sensors and switches, plural control sub-systems, and a driver manipulation unit 35 for allowing user input regarding the driving support modes. The plural sensors and switches include: a vehicle-mounted camera 21; a millimeter-wave radar 22; plural behavior sensors (a vehicle speed sensor 23, an acceleration sensor 24, and a yaw rate sensor 25) and plural behavior switches (a steering angle sensor 26, an accelerator sensor 27, and a brake sensor 28), a position measurement system 29, and a navigation system 30. Further, the plural control sub-systems include an engine control system 31, a brake control system 32 and a steering control system 33.

Other examples of the sensors and switches may include a peripheral sonar for measuring the distance and position of a surrounding structural object with respect to the vehicle 1, a corner radar for measuring a proximity of a surrounding structural object with respect to each of four corners of the vehicle 1, and an inner camera for taking an image of the inside of a passenger compartment of the vehicle 1. In this case, the ECU 10 is configured to receive measurement signals/data from these sensors and switches.

The driver manipulation unit 35 is provided in the passenger compartment of the vehicle 1 such that it can be manipulated by the driver, and comprises: a mode selection switch 36 for selecting a desired driving support mode from the plural driving support modes; a setting vehicle speed input part 37 for inputting a setting vehicle speed in accordance with the selected driving support mode; and an approval input part 38 for performing an approval input manipulation regarding a legal speed limit. The driver manipulation unit 35 may further comprise a setting inter-vehicle distance input part for setting an inter-vehicle distance between the vehicle 1 and a preceding vehicle. In response to manipulation of the mode selection switch 36 by the driver, a driving support mode selection signal according to the selected driving support mode is output.

The setting vehicle speed input part 37 comprises a vehicle speed change button, a setup vehicle speed display, and a confirmation button. The driver can manipulate the vehicle speed change button such that a desired setup vehicle speed is displayed on the setup vehicle speed display. Through this manipulation, a setup vehicle speed signal representing the displayed setup vehicle speed is output.

The approval input part 38 comprises a legal speed limit display, and an approval button. The driver can push down the approval button after confirming that a legal speed limit displayed on the legal speed limit display is coincident with a speed designated by a speed sign outside the vehicle 1. Through this manipulation, an approval signal is output.

The ECU 10 is composed of a computer comprising a CPU, a memory storing therein various programs, and an input/output device. The ECU 10 is configured to be operable, based on the driving support mode selection signal, the setting vehicle speed signal and the approval signal each received from the driver manipulation unit 35, and signals received from the plural sensors and switches, to output request signals for appropriately operating an engine system, a brake system and a steering system, respectively, to the engine control system 31, the brake control system 32 and the steering control system 33.

The vehicle-mounted camera 21 is operable to take images around the vehicle 1 and output image data about the taken images. The ECU 10 is operable to identify an object (e.g., a vehicle, a pedestrian, a road, a demarcation line (a lane border line, a white road line or a yellow road line), a traffic light, a traffic sign, a stop line, an intersection, an obstacle or the like) based on the image data. Alternatively or additionally, the ECU 10 may be configured to acquire information regarding such an object from outside via an in-vehicle communication device.

The millimeter-wave radar 22 is a measurement device for measuring the position and speed of the object (particularly, a preceding vehicle, a parked vehicle, a pedestrian, an obstacle or the like), and is operable to transmit a radio wave (transmitted wave) forwardly with respect to the vehicle 1 and receive a reflected wave produced as a result of reflection of the transmitted wave by the object. Then, the millimeter-wave radar 22 is operable, based on the transmitted wave and the received wave, to measure a distance between the vehicle 1 and the object, i.e., a vehicle-object distance, (e.g., inter-vehicle distance) and/or a relative speed of the object with respect to the vehicle 1. In this embodiment, instead of the millimeter-wave radar 22, a laser radar, an ultrasonic sensor or the like may be used to measure the vehicle-object distance and/or the relative speed. Further, the position and speed measurement device may be composed using a plurality of sensors.

The vehicle speed sensor 23 is operable to detect an absolute speed of the vehicle 1.

The accelerator sensor 24 is operable to detect an acceleration (a longitudinal acceleration/deceleration in a longitudinal (forward-rearward) direction, and a lateral acceleration in a lateral (width) direction) of the vehicle 1.

The yaw rate sensor 25 is operable to detect a yaw rate of the vehicle 1.

The steering angle sensor 26 is operable to detect a turning angle (steering angle) of a steering wheel of the vehicle 1.

The accelerator sensor 27 is operable to detect a depression amount of an accelerator pedal.

The brake sensor 28 is operable to detect a depression amount of a brake pedal.

The position measurement system 29 is composed of a GPS system and/or a gyro system, and is operable to detect the position of the vehicle 1 (current vehicle position information).

The navigation system 30 stores therein map information, and is operable to provide the map information to the ECU 10. Then, the ECU 10 is operable, based on the map information and the current vehicle position information, to identify a road, an intersection, a traffic light, a building and others existing around the vehicle 1 (particularly, ahead of the vehicle 1 in the travelling direction). The map information may be stored in the ECU 10.

The engine control system 31 comprises a controller for controlling an engine of the vehicle 1. The ECU 10 is operable, when there is a need to accelerate or decelerate the vehicle 1, to output, to the engine control system 31, an engine output change request signal for requesting to change an engine output.

The brake control system 32 comprises a controller for controlling a braking device of the vehicle 1. The ECU 10 is operable, when there is a need to decelerate the vehicle 1, to output, to the brake control system 32, a braking request signal for requesting to generate a braking force to be applied to the vehicle 1.

The steering control system 33 comprises a controller for controlling a steering device of the vehicle 1. The ECU 10 is operable, when there is a need to change the travelling direction of the vehicle 1, to output, to the steering control system 33, a steering direction change request signal for requesting to change a steering direction.

Next, the driving support modes in the driving support control system 100 according to this embodiment will be described. In this embodiment, the driving support modes consist of four modes (a preceding vehicle following mode, an automatic speed control mode, a speed limiting mode, and a basic control mode).

Firstly, the preceding vehicle following mode is a mode in which the vehicle 1 is basically controlled to travel following a preceding vehicle, while maintaining a given inter-vehicle distance between the vehicle 1 and the preceding vehicle, and involves automatic steering control, automatic speed control (engine control and/or brake control), automatic obstacle avoidance control (the speed control and the steering control) to be executed by the driving support control system 100.

In the preceding vehicle following mode, the steering control and the speed control are performed in different manners, depending on detectability of opposed lane edges, and the presence or absence of a preceding vehicle. Here, the term "opposed lane edges" means opposed edges (a demarcation line such as a white road line, a road edge, an edge stone, a median strip, a guardrail or the like) of a lane in which the vehicle 1 is traveling, i.e., borderlines with respect to a neighboring lane and sidewalk, or the like. The ECU 10 is operable, when serving as a traveling road edge detection part, to detect the opposed lane edges from the image data about the images taken by the vehicle-mounted camera 21. Alternatively, the ECU 10 may be configured to detect the opposed lane edges from the map information of the navigation system 30. However, for example, in a situation where the vehicle 1 is traveling on the plain on which there is no traffic lane, instead of on a well-maintained road, or in a situation where reading of the image data from the vehicle-mounted camera 21 is bad, there is a possibility of failing to detect the opposed lane edges.

As above, in this embodiment, the ECU 10 is configured to serve as the traveling road edge detection part. Alternatively, the vehicle-mounted camera 21 may be configured to detect the opposed lane edges to serve as the traveling road edge detection part, or may be configured to detect the opposed lane edges in cooperation with the ECU 10 to serve as the traveling road edge detection part.

Further, the ECU 10 is operable, when serving as a preceding vehicle detection part, to detect a preceding vehicle, based on the image data from the vehicle-mounted camera 21, and the measurement data from the millimeter-wave radar 22. Specifically, the ECU 10 is operable to detect a second vehicle which is traveling ahead of the vehicle 1, as a preceding vehicle, based on the image data from the vehicle-mounted camera 21. Further, in this embodiment, the ECU 10 is operable, when the inter-vehicle distance between the vehicle 1 and the second vehicle is determined to be equal to or less than a given value (e.g., 400 to 500 m), based on the measurement data from the millimeter-wave radar 22, to detect the second vehicle as a preceding vehicle.

As above, in this embodiment, the ECU 10 is configured to serve as the preceding vehicle detection part. Alternatively, the vehicle-mounted camera 21 may be configured to detect a second vehicle which is traveling ahead of the vehicle 1 to serve as the preceding vehicle detection part, or the preceding vehicle detection part may be composed of not only the ECU 10 but also the vehicle-mounted camera 21 and the millimeter-wave radar 22.

In the case where the opposed lane edges are detected, the steering control is performed such that the vehicle 1 is steered to travel along approximately the middle of the lane, and the speed control is performed such that the vehicle 1 maintains a setup vehicle speed (constant speed) preliminarily set by the driver through the use of the setting vehicle speed input part 37 or by the system 100 based on given processing. Here, when the setup vehicle speed is greater than a speed limit (which is determined according to a speed sign or the curvature of a curve), priority is given to the speed limit, so that the vehicle speed of the vehicle 1 is limited to the speed limit. When the speed limit is determined according to the curvature of a curve, it is calculated by a given calculation formula, wherein it is set to a lower value as the curvature of the curve becomes larger (a curvature radius of the curve becomes smaller).

Further, when the setup vehicle speed of the vehicle 1 is greater than the vehicle speed of a preceding vehicle, the speed control is performed such that the vehicle 1 follows the preceding vehicle while maintaining an inter-vehicle distance appropriate to a follow-up vehicle speed. Then, when the preceding vehicle being followed by the vehicle 1 disappears from ahead of the vehicle 1 due to lane change or the like, the speed control is performed such that the vehicle 1 maintains the setup vehicle speed, again.

On the other hand, in a case where the opposed lane edges are not detected, and there is a preceding vehicle, the steering control is performed such that the vehicle 1 follows a traveling trajectory of the preceding vehicle, and the speed control is performed such that the vehicle 1 follows the speed on the traveling trajectory of the preceding vehicle.

Further, in a case where the opposed lane edges are not detected, and there is not any preceding vehicle (it is unable to detect any demarcation line and follow any preceding vehicle), it is unable to determine a traveling position on a traveling road. In this case, the driver manually controls vehicle steering and vehicle speed by manipulating the steering wheel, and the accelerator pedal and/or brake pedal so as to maintain or change a current traveling behavior (steering angle, yaw rate, vehicle speed, acceleration/deceleration, or the like) according to the will of the driver.

Secondly, the automatic speed control mode is a mode in which the speed control is performed such that the vehicle 1 maintains a given setup vehicle speed (constant speed) preliminarily set by the driver or the system 100, and involves the automatic speed control (the engine control and/or the brake control) to be executed by the driving support control system 100, wherein, basically, the automatic steering control is not performed. However, in a situation where the vehicle 1 deviates from a traveling road (lane) or is likely to collide with an obstacle (neighboring vehicle or structural object), deceleration control appropriate to a distance with the obstacle and the automatic steering control are executed by the driving support control system 100.

In this automatic speed control mode, although the vehicle 1 is controlled to travel to maintain the setup vehicle speed, the driver can increase the vehicle speed beyond the setup speed by depressing the accelerator pedal (accelerator override control). Further, when the driver performs brake manipulation, the highest priority is given to the will of the driver, and therefore the vehicle 1 is decelerated from the setup vehicle speed. In the automatic speed control mode, when the vehicle 1 catches up to a preceding vehicle, the speed control is performed such that the vehicle 1 follows the preceding vehicle while maintaining an inter-vehicle distance appropriate to a follow-up vehicle speed, and then when the preceding vehicle disappears, the speed control is performed such that the follow-up vehicle speed is returned to the setup vehicle speed.

Thirdly, the speed limiting mode is a mode in which the speed control is performed to prevent the vehicle speed of the vehicle 1 from exceeding a speed limit (legal speed limit) designated by a speed sign, and involves the automatic speed control (engine control) to be executed by the driving support control system 100. With respect to the legal speed limit, the ECU 10 may be configured to subject image data about an image of a speed sign or a speed marking on a road surface taken by the vehicle-mounted camera 21, to image recognition processing, to identify the legal speed limit, or may be configured to receive information regarding the legal speed limit from outside via a wireless communication. This legal speed limit is input from the ECU 10 into the driver manipulation unit 35, and displayed on the legal speed limit display of the approval input part 38. In the speed limiting mode, even when the driver depresses the accelerator pedal so as to increase the vehicle speed beyond the limiting speed, the vehicle speed of the vehicle 1 is increased only up to the limiting speed.

Fourthly, the basic control mode is a mode (off mode) in which none of the driving support modes is selected through the driver manipulation unit 35, and the automatic steering control and speed control are not executed by the driving support control system 100. However, the basic control mode is configured to execute an automatic anti-collision control. In this anti-collision control, when the vehicle 1 encounters a situation where it is likely to collide with a preceding vehicle or the like, the brake control is automatically executed to avoid the collision. It should be noted that the anti-collision control is also executed in the preceding vehicle following mode, the automatic speed control mode, and the speed limiting mode in the same manner.

Further, the obstacle avoidance control (only the speed control, or the speed control and the steering control) is also executed in the automatic speed control mode, the speed limiting mode and the basic control mode.

Figure 2:
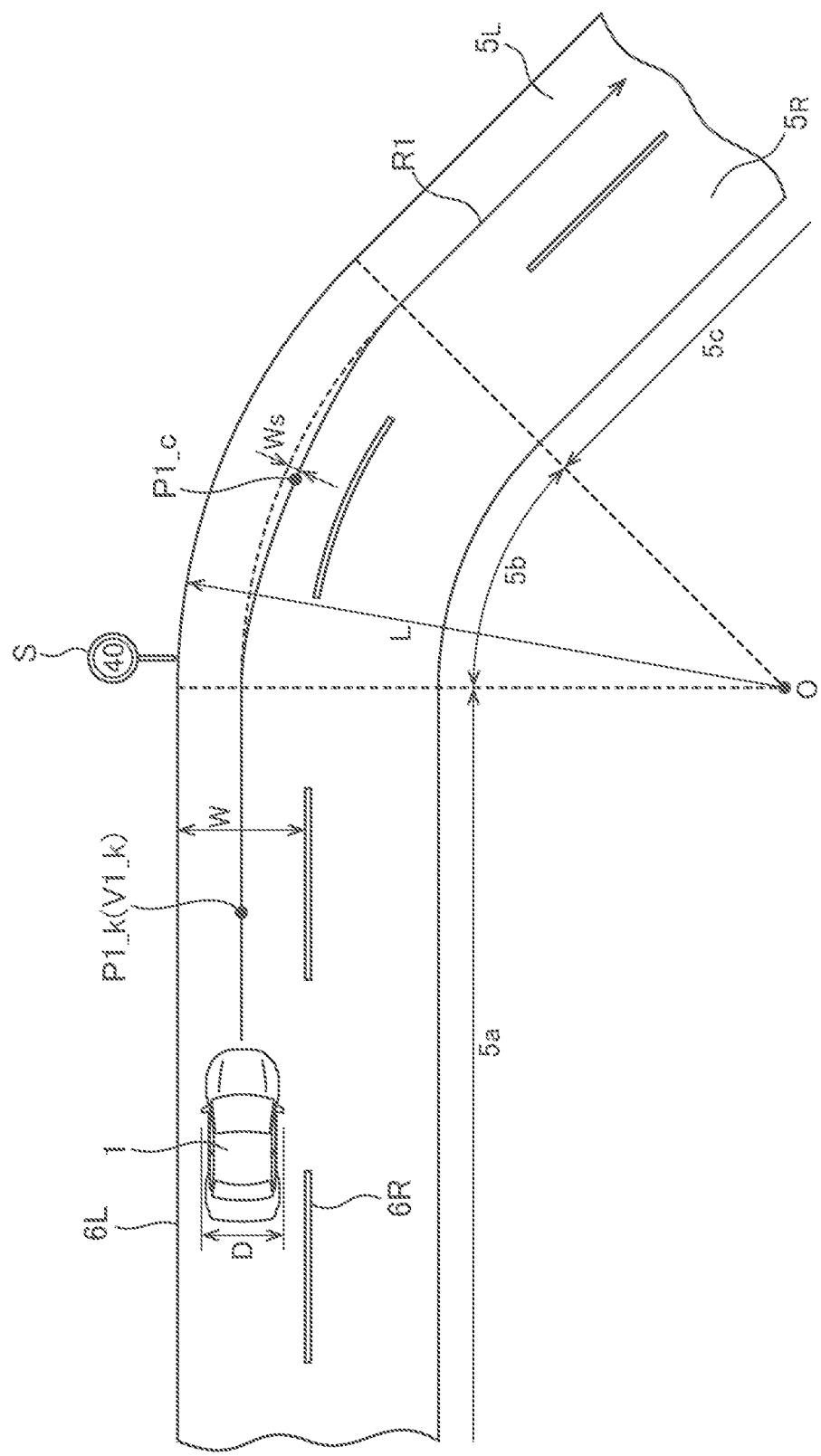
FIG. 2 is an explanatory diagram of a first traveling course in this embodiment.
Figure 3:
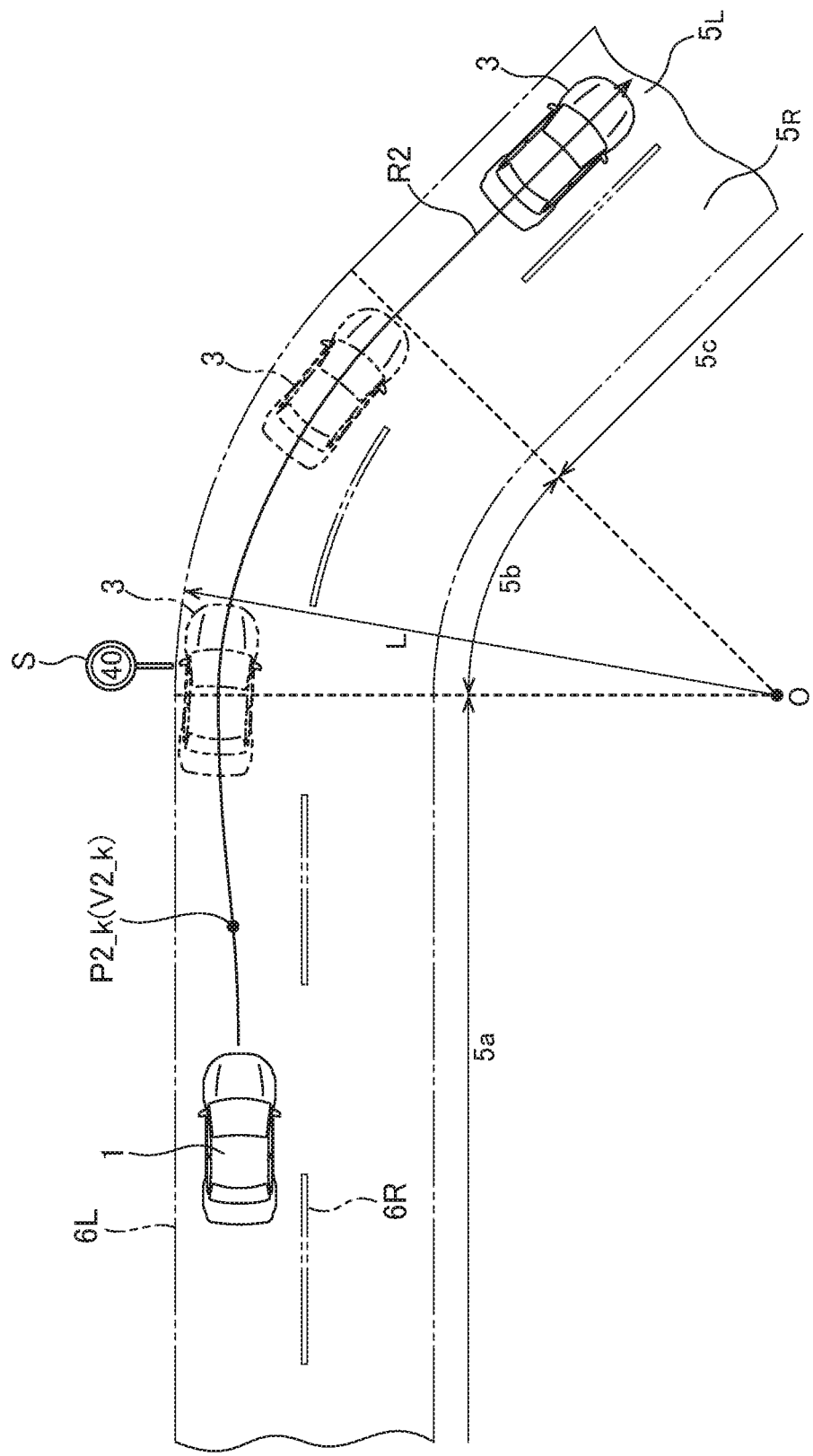
FIG. 3 is an explanatory diagram of a second traveling course in this embodiment.

Next, with reference to FIGS. 2 to 4, plural traveling courses to be calculated in the driving support control system 100 according to this embodiment will be described. FIGS. 2 to 4 are explanatory diagrams of first to third traveling courses, respectively. In this embodiment, the ECU 10 is configured to calculate the first to third traveling courses R1 to R3 temporally repeatedly (e.g., at intervals of 0.1 sec). In this embodiment, the ECU 10 is operable, based on information from the sensors and others, to calculate a traveling course in a period from a present time through until a given time period (e.g., 2 to 4 sec) elapses. The traveling course Rx (where x=1, 2, 3) is defined by a target position (Px_k) and a target speed (Vx_k) (where k=0, 1, 2, - - - , n) of the vehicle 1 on the traveling course.

Each of the traveling courses (first to third traveling courses) in FIGS. 2 to 4 is calculated based on the shape of a traveling road on which the vehicle 1 is traveling, the traveling trajectory of a preceding vehicle, the traveling behavior of the vehicle 1, and the setup vehicle speed, without taking into account obstacle information regarding an obstacle (including a parked vehicle, a pedestrian and the like) on the traveling road or around the traveling road (i.e., information regarding an obstacle whose situation can vary temporally), and traveling situation change information regarding a change in traveling situation. The traveling situation change information may include traveling regulation information regarding traveling regulation according to traffic regulations (a traffic light, a traffic sign and the like) (i.e., information detectable on site during traveling, instead of the map information), and lane change request information according to the will of the driver (the will to change a course, such as manipulation of a winker (turning signal)). As above, in this embodiment, the traveling course is calculated without taking into account the obstacle information, the traveling regulation information and the like, so that it is possible to keep down the overall calculation load for calculating the plural traveling courses.

For the sake of facilitating understanding, the following description will be made based on an example where each of the traveling courses is calculated on the assumption that the vehicle 1 travels on a road 5 consisting of a straight section 5a, a curve section 5b, a straight section 5c. The road 5 comprises left and right lanes 5L, 5R. Assume that, at a present time, the vehicle 1 travels on the lane 5L in the straight section 5a.

As shown in FIG. 2, the first traveling course R1 is set, by a distance corresponding to a given time period, to enable the vehicle 1 to maintain traveling within the lane 5L serving as the traveling road, in conformity to the shape of the road 5. Specifically, the first traveling course R1 is set, in each of the straight sections 5a, 5c, to enable the vehicle 1 to maintain traveling along approximately the widthwise middle of the lane 5L, and set, in the curve section 5b, to enable the vehicle 1 to travel on an inner side or in-side (on the side of a center O of a curvature radius L of the curve section 5b) with respect to the widthwise middle of the lane 5.

The ECU 10 is operable to execute the image recognition processing for image data about images around the vehicle 1 taken by the vehicle-mounted camera 21, to detect opposed lane edges 6L, 6R. The opposed lane edges are a demarcation line (white road line or the like), and a road shoulder or the like, as mentioned above. Further, the ECU 10 is operable, based on the detected opposed lane edges 6L, 6R, to calculate a lane width W of the lane 5L and the curvature radius L in the curve section 5b. Alternatively, the ECU 10 may be configured to acquire the lane width W and the curvature radius L from the map information of the navigation system 30. Further, the ECU 10 is operable to read, from the image data, a speed limit indicated by a speed sign S or on the road surface. Alternatively, the ECU 10 may be configured to acquire the speed limit from outside via a wireless communication, as mentioned above.

With regard to the straight sections 5a, 5c, the ECU 10 is operable to set a plurality of a target positions $P1\_k$ of the first traveling course R1 to enable a widthwise middle (e.g., the position of the center of gravity) of the vehicle 1 to pass through the widthwise middle between the opposed lane edges 6L, 6R. In this embodiment, the ECU 10 is operable to set the first traveling course R1 to enable the vehicle 1 to travel along the middle of the lane in each of the straight sections, as mentioned above. Alternatively, the ECU 10 may be configured to set the first traveling course R1 while reflecting a driving characteristic (preference or the like) of the driver, for example, such that the first traveling course R1 extends along a line adjacent to the middle of the lane and offset in the width direction by a given shift amount (given distance) with respect to the middle of the lane.

On the other hand, with respect to the curve interval 5b, the ECU 10 is operable to maximally set a displacement amount Ws toward the in-side from the widthwise middle position of lane 5L at a longitudinal middle position $P1\_c$ of the curve interval 5b. This displacement amount Ws is calculated based on the curvature radius L, the lane width W, and a width dimension D of the vehicle 1 (prescribed value stored in the memory of the ECU 10). Then, the ECU 10 is operable to set a plurality of target positions $P1\_k$ of the first traveling course R1 in such a manner as to smoothly connect the longitudinal middle position $P1\_c$ of the curve section 5b to the widthwise middle position of each of the straight sections 5a, 5b. Here, it should be understood that the first traveling course R1 may also be offset toward the in-side in the straight sections 5a 5c at positions just before entering the curve section 5b and just after exiting the curve section 5b.

Basically, a target speed $V1\_k$ at the target position $P1\_k$ of the first traveling course R1 is set to a given setup vehicle speed (constant speed) preliminarily set by the driver through the use of the setting vehicle speed input part 37 of the driver manipulation unit 35 or by the system 100. However, when this setup vehicle speed exceeds the speed limit acquired from a speed sign or the like, or the speed limit determined according to the curvature radius L of the curve section 5b, the target speed $V1\_k$ at the target position $P1\_k$ on the traveling course is limited to a lower one of the two speed limits. Further, the ECU 10 is operable to correct the target position $P1\_k$ and the target speed $V1\_k$, according to a current behavior state (i.e., vehicle speed, acceleration/deceleration, yaw rate, steering angle, lateral acceleration, etc.) of the vehicle 1. For example, when a current value of the vehicle speed is largely different from the setup vehicle speed, the target speed is corrected so as to enable the vehicle speed to come close to the setup vehicle speed.

Basically, the first traveling course R1 is used in the situation where the opposed lane edges are detected. Thus, in a situation where the opposed lane edges are not detected, the first traveling course R1 needs not be calculated. However, in preparation for a situation where the first traveling course R1 is erroneously selected even though the opposed lane edges are not detected, the first traveling course R1 may be calculated in the following alternative manner.

In such a situation, the ECU 10 is operable, assuming that the vehicle 1 travels along the middle of the lane 5L, set virtual opposed lane edges, using the steering angle or yaw rate according to the vehicle speed of the vehicle 1. Then, the ECU 10 is operable, based on the virtually-set opposed lane edges, to calculate the first traveling course to enable the vehicle 1 to travel along the middle of the lane, in each of the straight sections and travel on the in-side of the lane, in the curve section.

As shown in FIG. 3, the second traveling course R2 is set, by a distance corresponding to a given time period, to enable the vehicle 1 to follow a traveling trajectory of a preceding vehicle 3. The ECU 10 is operable to continuously calculate the position and speed of the preceding vehicle 3 on the lane 5L on which the vehicle 1 is traveling, based on the image data from the vehicle-mounted camera 21, the measuring data from the millimeter-wave radar 22, and the vehicle speed of the vehicle 1 from the vehicle speed sensor 23, and store the calculated position and speed as preceding vehicle trajectory information, and, based on the preceding vehicle trajectory information, to set the traveling trajectory of the preceding vehicle 3 as the second traveling course R2 (a target position $P2\_k$ and a target speed $V2\_k$). The second traveling course R2 is basically selected in the situation where the opposed lane edges are not detected (therefore, in FIG. 3, load lines are indicated by the two-dot chain lines for the sake of facilitating understanding).

In this embodiment, the second traveling course R2 is basically calculated in the situation where a preceding vehicle is detected. Thus, in a situation where no preceding vehicle is detected, the second traveling course R2 needs not be calculated. However, in preparation for a situation where the second traveling course R2 is erroneously selected even though no preceding vehicle is detected, the second traveling course R2 may be calculated in the following alternative manner.

In such a situation, the ECU 10 is operable, assuming that a preceding vehicle is traveling at a position ahead of the vehicle 1 by a given distance according to the vehicle speed of the vehicle 1. Further, assume that this virtual preceding vehicle has the same traveling behavior (vehicle speed, steering angle, yaw rate, etc.) as that of the vehicle 1. Then, the ECU 10 is operable to calculate the second traveling course R2 to follow the virtual preceding vehicle.

As shown in FIG. 4, the third traveling course R3 is set, by a distance corresponding to a given time period, based on a current driving state of the vehicle 1 by the driver. Specifically, the third traveling course R3 is set based on a position and a speed estimated from a current traveling behavior of the vehicle 1.

The ECU 10 is operable, based on the steering angle, the yaw rate and the lateral acceleration of the vehicle 1, to calculate a target position $P3\_k$ of the third traveling course R3 having the distance corresponding to the given time period. However, in the situation where the opposed lane edges are detected, the ECU 10 is operable to correct the target position $P3\_k$ so as to prevent the calculated third traveling course R3 from coming close to or intersecting with any of the lane edges.

Further, the ECU 10 is operable, based on current values of the vehicle speed and the acceleration/deceleration of the vehicle 1, to calculate a target speed $V3\_k$ of the third traveling course R3 having the distance corresponding to the given time period. Here, when the target speed $V3\_k$ exceeds the speed limit acquired from the speed sign S or the like, the target speed V3_k may be corrected so as not to exceed the speed limit.

Next, with reference to FIG. 5, a relationship between the driving support mode and the target traveling course in the driving support control system 100 will be described. FIG. 5 is an explanatory diagram showing the relationship between the driving support mode and the target traveling course. In this embodiment, the driving support control system 100 is configured such that, when the driver manipulates the mode selection switch 36 to select one of the driving support modes, the ECU 10 operates to select one of the first to third traveling courses R1 to R3 according to the measurement data from sensors and others. That is, in this embodiment, even when the driver selects a certain one of the driving support modes, the same traveling course is not always applied, but one of the traveling courses appropriate to a current traveling state is applied.

When the opposed lane edges are detected in a situation where the preceding vehicle following mode is selected, the first traveling course is applied, irrespective of the presence or absence of a preceding vehicle. In this case, the setup vehicle speed set through the use of the setting vehicle speed input part 37 is used as the target speed.

On the other hand, when the opposed lane edges are not detected but a preceding vehicle is detected in the situation where the preceding vehicle following mode is selected, the second traveling course is applied. In this case, the target speed is set according to the vehicle speed of the preceding vehicle. Further, when neither the opposed lane edges nor a preceding vehicle is detected in the situation where the preceding vehicle following mode is selected, the third traveling course is applied.

In the automatic speed control mode which is a mode in which the speed control is automatically executed, as mentioned above, the setup speed set through the use of the setting vehicle speed input part 37 is used as the target speed. Further, the driver manually controls vehicle steering by manipulating the steering wheel. Thus, although the third traveling course is applied, the vehicle 1 is likely not to travel along the third traveling course, depending on the driver's manipulation (of the steering wheel and/or the brake pedal).

Further, in a situation where the speed limiting mode is selected, the third traveling course is applied. In the speed limiting mode which is a mode in which the speed control is automatically executed, as mentioned above, the target speed is set according to the depression amount of the accelerator pedal by the driver, within the speed limit (maximum speed). Further, the driver manually controls vehicle steering by manipulating the steering wheel. Thus, although the third traveling course is applied, the vehicle 1 is likely not to travel along the third traveling course, depending on the driver's manipulation (of the steering wheel the brake pedal, and/or the accelerator pedal), as with the automatic speed control mode.

Further, in a situation where the basic control mode (off mode) is selected, the third traveling course is applied. The basic control mode is basically the same as the speed limiting mode in a state in which no speed limit is set.

Next, with reference to FIG. 6, a processing flow of driving support control in the driving support control system 100 according to this embodiment will be described. FIG. 6 is the processing flow of the driving support control.

The ECU 10 operates to repeatedly execute the processing flow in FIG. 6 at intervals of a given time period (e.g., 0.1 seconds). First of all, the ECU 10 operates to execute information acquisition processing (S11). In the information acquisition processing, the ECU 10 operates to: acquire the current vehicle position information and the map information, from the position measurement system 29 and the navigation system 30 (S11a); acquire sensor information from the vehicle-mounted camera 21, the millimeter-wave radar 22, the vehicle speed sensor 23, the acceleration sensor 24, the yaw rate sensor 25, the driver manipulation unit 35 and others (S11b); and acquire switch information from the steering angle sensor 26, the accelerator sensor 27, the brake sensor 28, the turning signal sensor and others (S11c).

Subsequently, the ECU 10 operates to execute given information detection processing (S12), using a variety of information acquired in the information acquisition processing (S11). In the information detection processing, the ECU 10 operates to detect, from the current vehicle position information, the map information and the sensor information, the traveling road information regarding a shape of a traveling road around and ahead of the vehicle 1 (the presence or absence of a straight section and a curve section, the length of each of the sections, the curvature radius of the curve section, a lane width, the positions of opposed lane edges, the number of lanes, the presence or absence of an intersection, a speed limit determined by the curvature of a curve, etc.), the traveling regulation information (legal speed limit, red light, etc.), the obstacle information (the presence or absence, the position, the speed, etc., of a preceding vehicle or an obstacle), the preceding vehicle trajectory information (the position and the vehicle speed of a preceding vehicle) (S12a).

Further, the ECU 10 operates to: detect, from the switch information, vehicle manipulation information (the steering angle, the accelerator depression amount, the brake pedal depression amount, etc.) (S12b); and detect, from the switch information and the sensor information, traveling behavior information regarding the behavior of the vehicle 1 (the vehicle speed, the acceleration/deceleration, the lateral acceleration, the yaw rate, etc.) (S12c).

Subsequently, the ECU 10 operates to execute traveling course calculation processing, based on information obtained by calculation (S13). In the traveling course calculation processing, a first traveling course calculation processing (S13a), a second traveling course calculation processing (S13b) and a third traveling course calculation processing (S13c) are executed in the aforementioned manner.

Specifically, in the first traveling course calculation processing, the ECU 10 operates to calculate, based on the setup vehicle speed, the opposed lane edges, the lane width, the speed limit, the (actual) vehicle speed, the acceleration/deceleration, the yaw rate, the steering angle, the lateral acceleration, etc., the traveling course R1 (target position P1_k and target speed V1_k) by a distance corresponding to a given time period (e.g., 2 to 4 sec), so as to enable the vehicle 1 to travel along approximately the middle of a lane in a straight section, and travel on the in-side of a curve in a curve section to have a larger turning radius, wherein a lowest one of the setup vehicle speed, a speed limit designated by a traffic sign, and a speed limit determined by the curvature of the curve is set as the maximum speed.

In the second traveling course calculation processing, the ECU 10 operates to calculate, based on the preceding vehicle trajectory information (position and speed) of the preceding vehicle acquired from the sensor information, etc., the traveling course R2 by a distance corresponding to a given time period, so as to enable to the vehicle 1 to follow the behavior (position and speed) of the preceding vehicle, while maintaining a given inter-vehicle distance between the preceding vehicle and the vehicle 1, i.e., behind the preceding vehicle by a time necessary to travel over the inter-vehicle distance.

In the third traveling course calculation processing, the ECU 10 operates to calculate the traveling course R3 estimated from a current behavior of the vehicle 1 based on the vehicle manipulation information, the traveling behavior information, etc., by a distance corresponding to a given time period.

Subsequently, the ECU 10 operates to execute the traveling course selection processing for selecting one target traveling course from the calculated three traveling courses (S14). In this processing, the ECU 10 operates to select the one target traveling course, based on the driving support mode selected by the driver through the use of the mode selection switch 36, detachability of the opposed lane edges, and the presence or absence of a preceding vehicle (see FIG. 5), as described above.

Subsequently, the ECU 10 operates to output, according to the selected driving support mode, a request signal to a concerned control sub-system (the engine control system 31, the brake control system 32 and/or the steering control system 33) so as to enable the vehicle 1 to travel on the finally calculated traveling course (S15).

Figure 7:
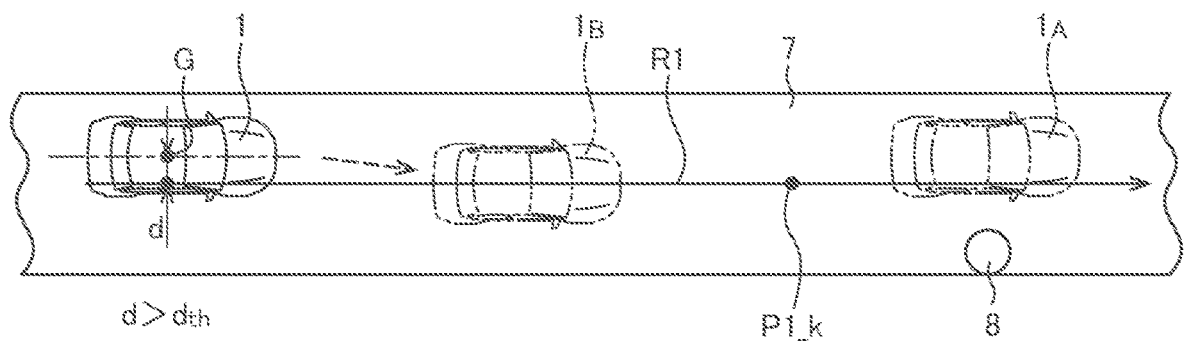
FIG. 7 is an explanatory diagram of a traveling state of a vehicle at the time of a driving support mode switching in this embodiment.

Next, with reference to FIGS. 7 and 8, mode switching processing for switching among the driving support modes in the driving support control system 100 according to this embodiment will be described. FIG. 7 is an explanatory diagram of a traveling state of the vehicle 1 at the time of a driving support mode switching, and FIG. 8 is a processing flow during switching to a preceding vehicle following mode.

In FIG. 7, the vehicle 1 is traveling on a road 7. A selected one of the driving support modes is a mode normally involving no steering control (the automatic speed control mode, the speed control mode or the basic control mode). Further, the driver drives the vehicle 1 to travel within the road 7 while deviating leftwardly from the widthwise middle of the road 7 so as to avoid an obstacle 8 existing in the vicinity of a right edge of the road 7 (see the vehicle $1_A$).

Normally, in the currently selected driving support mode, the automatic steering control of causing the vehicle 1 to travel on and along a setup target traveling course is not performed. Thus, the vehicle 1 can travel on and along a desired traveling course in accordance with a steering manipulation by the driver, irrespective of the setup target traveling course.

Assume that the driver selects the preceding vehicle following mode by the mode selection switch 36, in the situation as shown in FIG. 7. The first traveling course R1 is set to pass through the widthwise middle of the road 7. A current position of the vehicle 1 (e.g., a current center-of-gravity position G of the vehicle 1) deviates leftwardly in a width direction of the road 7 or a direction orthogonal to the traveling direction of the vehicle 1, with respect to the first traveling course R1 by a distance d.

In the situation as shown in FIG. 7, when the ECU 10 receives a driving support mode selection signal representing the preceding vehicle following mode, no preceding vehicle is detected, but opposite lane edges are detected. Thus, if the current driving support mode is transitioned to the preceding vehicle following mode, the first traveling course R1 will be selected as the target traveling course, and the automatic steering control will be performed to enable the vehicle 1 to travel along the first traveling course R1.

That is, in response to transition to the preceding vehicle following mode, the vehicle 1 traveling along the leftward position on the road 7 so as to avoid the obstacle 8 will be urged to move from the leftward position toward the widthwise middle of the road 7 (see the vehicle $1_B$ in FIG. 7). Then, in order to override the steering control in accordance with the preceding vehicle following mode, the driver has to manually perform the steering manipulation again to avoid the obstacle 8. In this case, the driver feels a feeling of strangeness during the driving support mode switching.

Therefore, in this embodiment, when performing a mode switching to a driving support mode in which the automatic steering control is executed to enable the vehicle 1 to travel along the target traveling course, in a situation where a current position of the vehicle 1 deviates in a large amount (specifically, beyond a given distance $d_{th}$) laterally from the target traveling course in the switched driving support mode, the mode switching is disabled. In this case, lighting of a given lamp or generation of warning sound may be used to inform the driver of the fact that the mode switching is disabled.

In the example shown in FIG. 7, a distance d between the current position (center-of-gravity position G) of the vehicle 1 at the time of the mode switching, and the target traveling course (first traveling course R1) to be set in the driving support mode selected by the driver is compared with a given distance $d_{th}$. Then, because the distance d is greater than the given distance $d_{th}$, the current driving support mode is not transitioned.

Next, with reference to FIG. 8, a processing flow during switching to the preceding vehicle following mode will be described. The ECU 10 operates to execute the processing routine in FIG. 8 temporally repeatedly. Here, the processing routine in FIG. 8 may be composed of a part of the traveling course selection processing (S14)

First of all, upon start of the processing routine, the ECU 10 operates to acquire a current position of the vehicle 1 in the same manner as that in the step S11 of FIG. 6 (S20), and further acquire the traveling courses calculated in the step S13 of FIG. 6 (S21).

Subsequently, the ECU 10 operates to determine whether or not there is a change in the driving support mode selection signal received from the mode selection switch 36 (S22). When there is no change in the previously-received driving support mode selection signal (S22: NO), i.e., the same driving support mode is continuously selected, the ECU 10 operates to terminate one processing cycle.

On the other hand, when there is a change in the driving support mode selection signal (S22: YES), the ECU 10 operates to determine, based on the changed driving support mode selection signal, whether or not the driver intends to switch from the current driving support mode to the preceding vehicle following mode (S23). When the intended switching destination is not the preceding vehicle following mode (S23: NO), the ECU 10 operates to terminate one processing cycle.

On the other hand, when the intended switching destination is the preceding vehicle following mode (S23: YES), the ECU 10 operates to determine whether or not the distance d between the current position of the vehicle 1 and the traveling course to be selected after the switching to the preceding vehicle following mode is greater than the given distance $d_{th}$ (S24).

When the distance d is greater than the given distance $d_{th}$ (S24: YES), the ECU 10 operates to terminate one processing cycle without mode transition to the preceding vehicle following mode. On the other hand, the distance d is equal to or less than the given distance $d_{th}$ (S24: NO), the ECU 10 operates to switch from the current driving support mode to the preceding vehicle following mode (S25), and then terminate one processing cycle.

Next, the functions of the driving support control system according to above embodiment will be described.

In the above embodiment, the driving support control device (ECU) 10 is capable of controlling a vehicle 1 in accordance with any one selected from plural driving support modes by a driver. The ECU 10 is configured to temporally repeatedly calculate a target traveling course (first to third traveling courses R1 to R3) along which the vehicle should travel. The ECU 10 is also configured to, in a preceding vehicle following mode, execute control of causing the vehicle 1 to travel on and along the target traveling course. The ECU 10 is operable, in a situation where a current position of the vehicle 1 deviates beyond a given distance $d_{th}$ laterally from the target traveling course, to, even when the driver selects the preceding vehicle following mode, prohibit transition to the preceding vehicle following mode.

In the driving support control device according to the above embodiment, in a situation where, when the driver selects a desired driving support mode so as to switch among the plural driving support modes, the selected driving support mode is the preceding vehicle following mode for controlling the vehicle 1 to travel on and along the target traveling course, and a current position of the vehicle 1 deviates beyond a given distance $d_{th}$ laterally from the target traveling course, mode transition to the preceding vehicle following mode is not executed. That is, in the present invention, in a situation where the driver drives the vehicle 1 to travel along a position deviating from the target traveling course, purposefully (with a view to avoid the obstacle 9 in FIG. 7), transition to the preceding vehicle following mode is prohibited. This makes it possible to prevent the vehicle 1 from starting moving toward an unintended position (e.g., a position where the obstacle 8 exists) immediately after switching the current driving support mode. As above, in the above embodiment, during the driving support mode switching, it becomes possible to perform mode transition which is safe and less likely to give the driver a feeling of strangeness.

Although the above embodiment has been described based on an example where a given driving support mode in which the automatic steering control is executed to enable the vehicle 1 to travel along the target traveling course is the preceding vehicle following mode. Alternatively, the given driving support mode may be any different mode. For example, the different mode may includes a new driving support mode, and an automatic speed control mode in which the automatic steering control is executed depending on situations.

LIST OF REFERENCE SIGNS

1: vehicle
10: driving support control device
35: driver manipulation unit
36: mode selection switch
37: setting vehicle speed input part
38: approval input part
100: driving support control system

The invention claimed is:
1. A driving support control device comprising:
a memory; and
a processor configured to control a vehicle in accordance with a given driving support mode selected from plural driving support modes by a driver,
wherein the plural driving support modes include a first driving support mode in which automatic steering control is restricted and a second driving support mode in which the automatic steering control is executed,
wherein the driving support control device is configured to temporally repeatedly calculate, even in the first driving support mode being selected, a traveling course for the second driving support mode along which the vehicle should travel,
wherein, when the driver manipulates a mode selection switch to select the second driving support mode instead of the first driving support mode which is the current driving support mode:
the driving support control device is operable, in a situation where the driving support control device determines that a current position of the vehicle deviates beyond a given distance in a lateral direction which is a width direction of a traveling road or a direction orthogonal to the traveling direction of the vehicle from the traveling course for the second driving support mode, to, regardless of the manipulation of the mode selection switch to select the second driving support mode by the driver, prohibit transition to the second driving support mode, and
the driving support control device is operable, in a situation where the driving support control device determines that the current position of the vehicle does not deviate beyond the given distance in the lateral direction from the traveling course for the second driving support mode, to permit transition to the second driving support mode, and execute control of causing the vehicle to travel on and along the traveling course for the second driving support mode as a target traveling course.

2. The driving support control device as recited in claim 1, wherein the traveling course for the second driving support mode is a traveling course set to maintain traveling within the traveling road.

3. The driving support control device as recited in claim 2, wherein the driving support control device is operable, in response to the manipulation of the mode selection switch by the driver, to start mode switching processing for switching to the given driving support mode selected by the driver.

4. The driving support control device as recited in claim 3, wherein when the driving support control device calculates the traveling course for the second driving mode, the driving support control device is operable to:
calculate
a first traveling course which is set to maintain traveling within the traveling road,
a second traveling course which is set to follow a trajectory of a preceding vehicle, and
a third traveling course which is set based on a current traveling behavior of the vehicle on the traveling road; and
select, as the target traveling course, one of the calculated traveling courses, based on the driving support mode selected by the driver.

5. The driving support control device as recited in claim 2, wherein the driving support control device is operable, when the second driving support mode is selected during execution of a driving support mode other than the second driving support mode, in the situation where the current position of the vehicle deviates beyond the given distance in the lateral direction from the traveling course for the second driving support mode, to prohibit transition to the second driving support mode.

6. The driving support control device as recited in claim 2, wherein when the driving support control device calculates the traveling course for the second driving mode, the driving support control device is operable to:
calculate
a first traveling course which is set to maintain traveling within the traveling road,
a second traveling course which is set to follow a trajectory of a preceding vehicle, and
a third traveling course which is set based on a current traveling behavior of the vehicle on the traveling road; and
select, as the target traveling course, one of the calculated traveling courses, based on the driving support mode selected by the driver.

7. The driving support control device as recited in claim 6, wherein the plural driving support modes includes at least a preceding vehicle following mode in which control of causing the vehicle to follow the preceding vehicle is executed,
wherein, in a situation where the preceding vehicle following mode is selected, (i) the first traveling course is selected as the target traveling course when opposed lane edges of the traveling road are detected, irrespective of the presence or absence of the preceding vehicle, (ii) the second traveling course is selected as the target traveling course when the opposed lane edges are not detected but the preceding vehicle is detected, and (iii) the third traveling course is selected as the target traveling course when neither the opposed lane edges nor the preceding vehicle is detected.

8. The driving support control device as recited in claim 7, wherein the plural driving support modes further includes an automatic speed control mode in which control of causing the vehicle to travel at a given setup vehicle speed is executed,
wherein, in a situation where the automatic speed control mode is selected, the third traveling course is applied as the target traveling course when controlling the vehicle in accordance with the automatic speed control mode.

9. The driving support control device as recited in claim 7, wherein the plural driving support modes further includes a speed limiting mode in which a vehicle speed of the vehicle is restricted from exceeding a legal speed limit designated by a speed sign,
wherein, in a situation where the speed limiting mode is selected, the third traveling course is applied as the target traveling course when controlling the vehicle in accordance with the speed limiting mode.

10. The driving support control device as recited in claim 7, wherein the driving support control device comprises a basic control mode in which none of the driving support modes is selected and automatic steering control and speed control are not executed by the driving support control device,
wherein, in a situation where the basic control mode is selected, the third traveling course is applied as the target traveling course when controlling the vehicle in accordance with the basic control mode.

11. The driving support control device as recited in claim 1, wherein the driving support control device is operable, in response to the manipulation of the mode selection switch by the driver, to start mode switching processing for switching to the given driving support mode selected by the driver.

12. The driving support control device as recited in claim 11, wherein the driving support control device is operable, when the second driving support mode is selected during execution of a driving support mode other than the second driving support mode, in the situation where the current position of the vehicle deviates beyond the given distance in the lateral direction from the traveling course for the second driving support mode, to prohibit transition to the second driving support mode.

13. The driving support control device as recited in claim 11, wherein when the driving support control device calculates the traveling course for the second driving mode, the driving support control device is operable to:
calculate
a first traveling course which is set to maintain traveling within the traveling road,
a second traveling course which is set to follow a trajectory of a preceding vehicle, and
a third traveling course which is set based on a current traveling behavior of the vehicle on the traveling road; and
select, as the target traveling course, one of the calculated traveling courses, based on the driving support mode selected by the driver.

14. The driving support control device as recited in claim 1, wherein the driving support control device is operable, when the second driving support mode is selected during execution of a driving support mode other than the second driving support mode, in the situation where the current position of the vehicle deviates beyond the given distance in the lateral direction from the traveling course for the second driving support mode, to prohibit transition to the second driving support mode.

15. The driving support control device as recited in claim 1, wherein when the driving support control device calculates the traveling course for the second driving mode, the driving support control device is operable to:
calculate
a first traveling course which is set to maintain traveling within the traveling road,
a second traveling course which is set to follow a trajectory of a preceding vehicle, and
a third traveling course which is set based on a current traveling behavior of the vehicle on the traveling road; and
select, as the target traveling course, one of the calculated traveling courses, based on the driving support mode selected by the driver.

16. The driving support control device as recited in claim 15, wherein the plural driving support modes include:
an automatic speed control mode in which control of causing the vehicle to travel at a given setup vehicle speed is executed;
a preceding vehicle following mode in which control of causing the vehicle to follow the preceding vehicle is executed; and
a speed limiting mode in which a vehicle speed of the vehicle is restricted from exceeding a legal speed limit designated by a speed sign on a road,
wherein the second driving support mode is the preceding vehicle following mode.

17. A driving support control device comprising:
a memory; and
a processor configured to control a vehicle in accordance with a given driving support mode selected from plural driving support modes by a driver, wherein the plural driving support modes include an automatic speed control mode in which control of causing the vehicle to travel at a given setup vehicle speed set by the driver is executed and a preceding vehicle following mode in which control of causing the vehicle to follow a preceding vehicle is executed, wherein the driving support control device is configured to temporally repeatedly calculate, even in the automatic speed control mode being selected, a traveling course for the preceding vehicle following mode along which the vehicle should travel, wherein, when the driver manipulates a mode selection switch to select the preceding vehicle following mode instead of the automatic speed control mode which is the current driving support mode:

the driving support control device is operable, in a situation where the driving support control device determines that a current position of the vehicle deviates beyond a given distance in a lateral direction which is a width direction of a traveling road or a direction orthogonal to the traveling direction of the vehicle from the traveling course for the preceding vehicle following mode, to, regardless of the manipulation of the mode selection switch to select the preceding vehicle following mode by the driver, prohibit transition to the preceding vehicle following mode, and the driving support control device is operable, in a situation where the driving support control device determines that the current position of the vehicle does not deviate beyond the given distance in the lateral direction from the traveling course for the preceding vehicle following mode, to permit transition to the preceding vehicle following mode, and execute control of causing the vehicle to travel on and along the traveling course for the preceding vehicle following mode as a target traveling course.

18. The driving support control device as recited in claim 17, wherein the automatic speed control mode is a mode in which an automatic speed control including at least one of an engine control and a brake control is executed by the driving support control device such that a vehicle speed of the vehicle is controlled to maintain at the given setup vehicle speed, but automatic steering control is not executed except in a situation where the vehicle deviates from the traveling road or is likely to collide with an obstacle.

* * * * *